Dec. 18, 1951 F. SCALISE 2,578,843

AUTOMATIC TUNER AND TIME CIRCUIT CONTROL

Filed Dec. 23, 1948 3 Sheets-Sheet 1

INVENTOR.
FRANK SCALISE,
BY
McMorrow, Berman + Davidson
ATTORNEYS.

AUTOMATIC TUNER AND TIME CIRCUIT CONTROL

Filed Dec. 23, 1948 3 Sheets-Sheet 2

INVENTOR.
FRANK SCALISE,
BY
McMorrow, Berman + Davidson
ATTORNEYS.

Dec. 18, 1951

F. SCALISE 2,578,843

AUTOMATIC TUNER AND TIME CIRCUIT CONTROL

Filed Dec. 23, 1948

3 Sheets-Sheet 3

INVENTOR.
FRANK SCALISE,
BY
McMorrow, Berman + Davidson
ATTORNEYS.

Patented Dec. 18, 1951

2,578,843

UNITED STATES PATENT OFFICE 2,578,843

AUTOMATIC TUNER AND TIME CIRCUIT CONTROL

Frank Scalise, Harrisburg, Pa.

Application December 23, 1948, Serial No. 67,057

5 Claims. (Cl. 161—1)

This invention relates to time-controlled devices, and more particularly to a time-controlled tuning mechanism for radio receivers whereby various stations may be automatically tuned in at preset periodic time intervals.

A main object of the invention is to provide a novel and improved time-controlled automatic tuner for radio receivers which is simple in construction, easy to preset and reliable in operation.

A further object of the invention is to provide an improved time-controlled automatic tuner for radio receivers which is compact in size, inexpensive to manufacture and rugged in construction.

A still further object of the invention is to provide an improved time-controlled automatic tuner for radio receivers which may be preset to provide a choice of any one of a plurality of different stations for each one of a plurality of equal time subdivisions over a period of several hours, said tuner functioning to automatically set the local oscillator frequency, tuned circuit resonant frequency, or other appropriate circuits of the receiver to the correct values required to receive the desired stations at the times respectively preset.

A still further object of the invention is to provide an improved time controlled automatic tuner for radio receivers which may be preset to provide a choice of any one of a plurality of different stations for predetermined selected time periods over a total period of several hours with the receiver left free for manual tuning during the remainder of the time covered by said total period.

Further objects and advantages of the invention will become apparent from the following description and claims, and from the accompanying drawings, wherein:

Figures 1, 2:
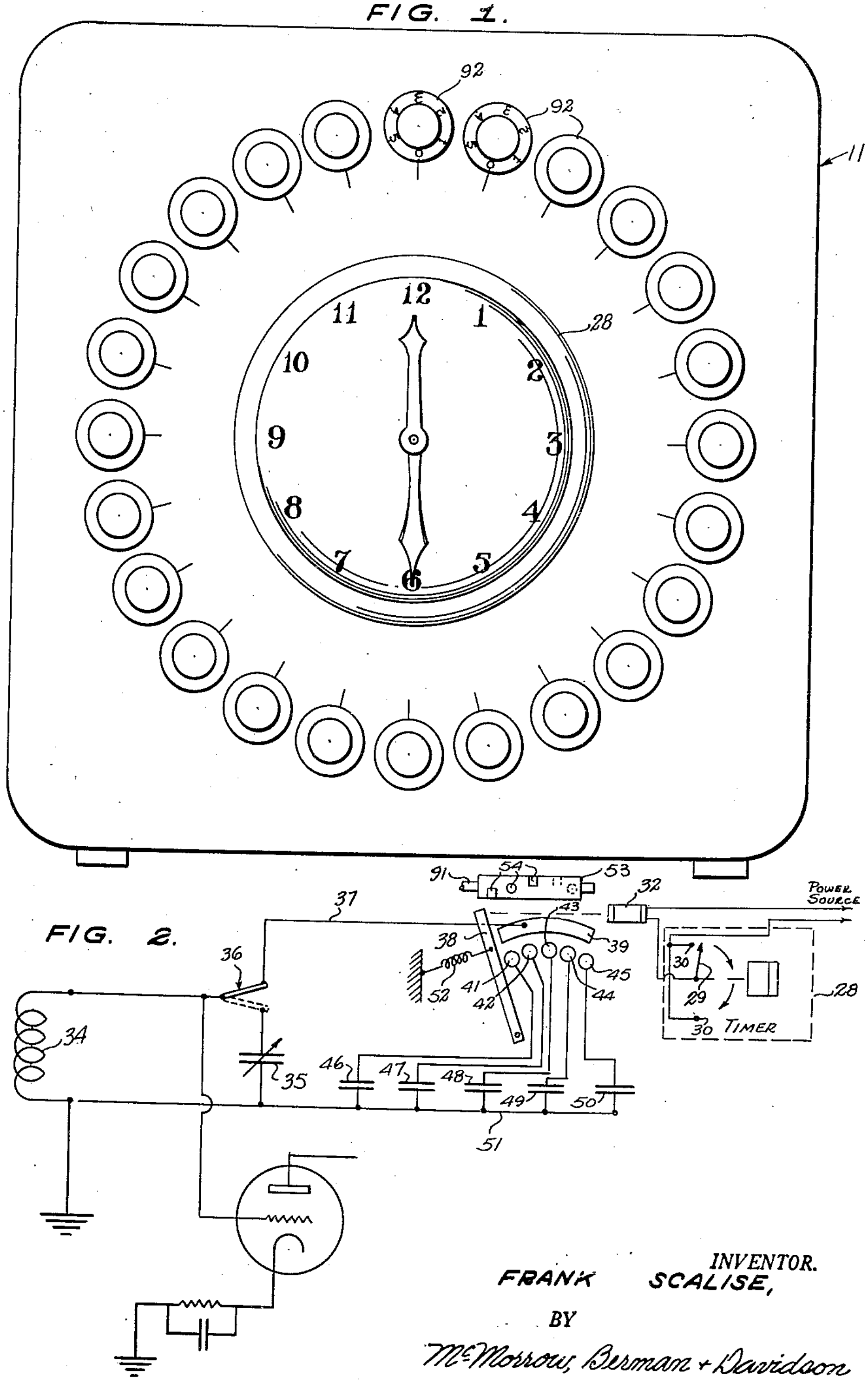
Figure 1 is a front elevational view of a time-controlled automatic radio tuner constructed in accordance with the present invention.
Figure 2 is a schematic diagram illustrating a simplified tuning arrangement broadly similar to the automatic tuner of Figure 1 and showing its manner of use.
Figures 3, 4, 7:
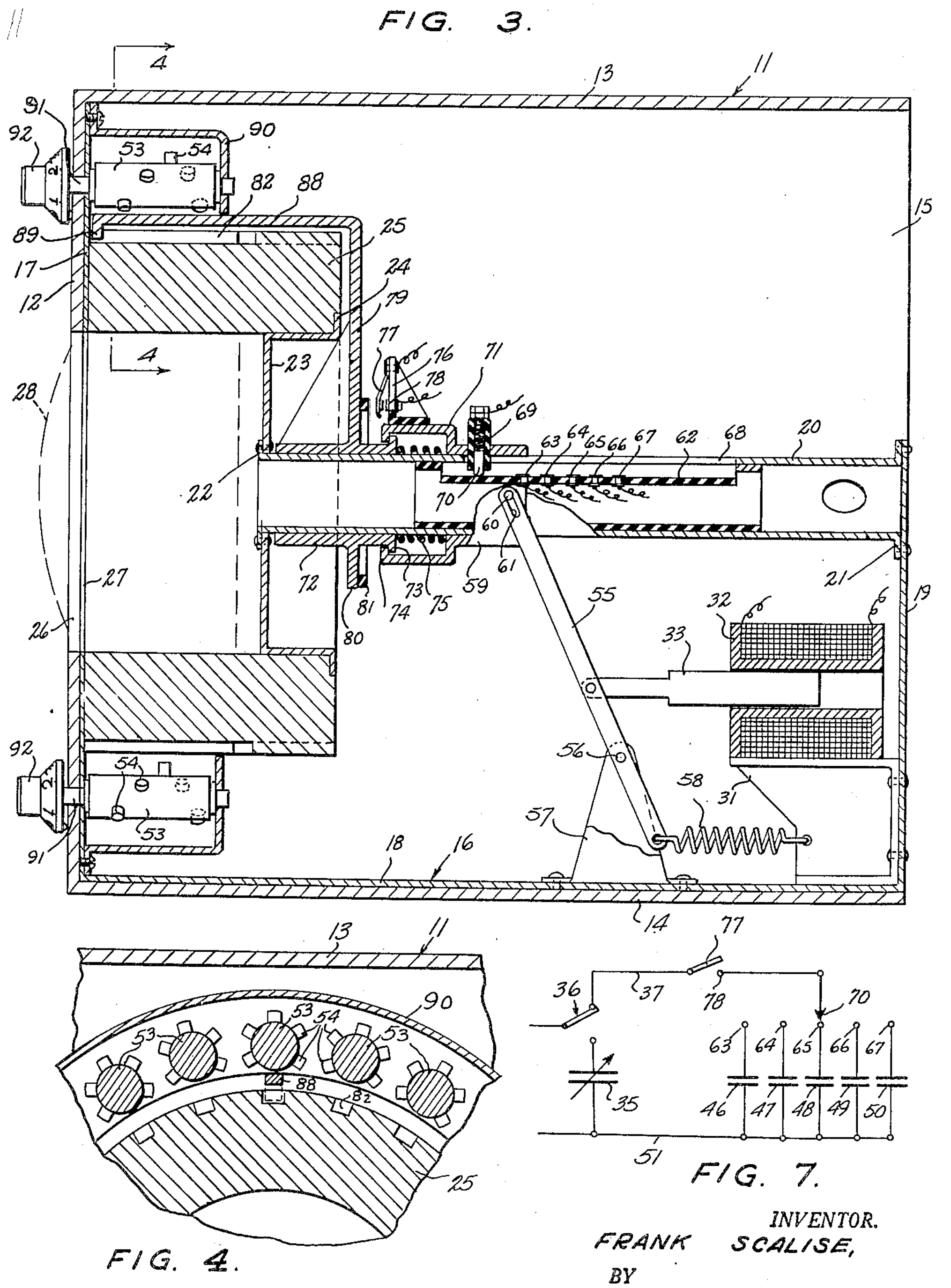
Figure 3 is a vertical cross-sectional view taken longitudinally through the automatic tuner of Figure 1, showing the tuner in a deenergized condition.
Figure 4 is an enlarged cross-sectional view taken on line 4—4 of Figure 3.
Figure 7 is a partial schematic diagram showing the electrical connections of the contact elements of the specific device illustrated in Figures 1 and 3 to 6.
Figures 5, 6:
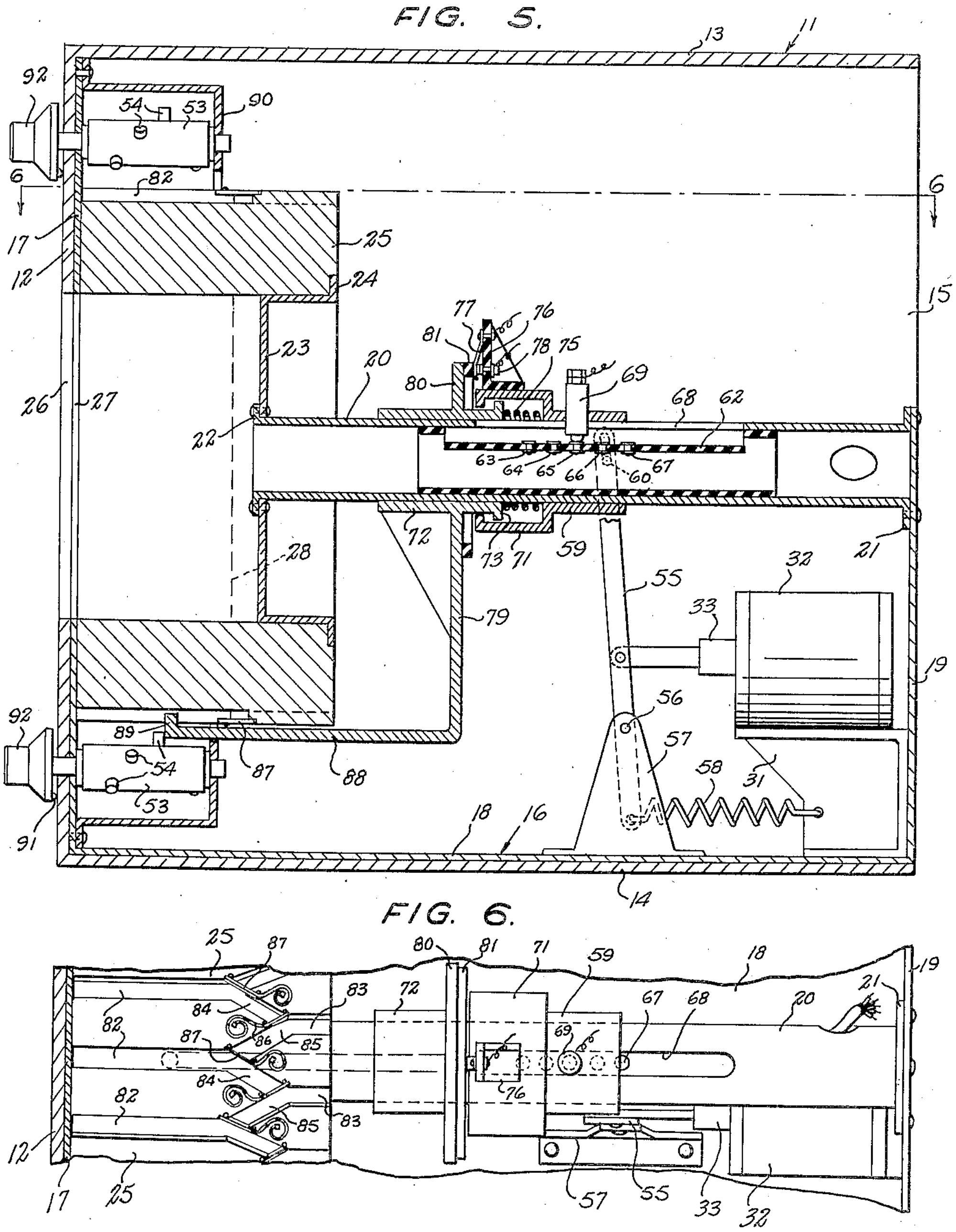
Figure 5 is a view similar to Figure 3 but showing the tuner in a station-selecting position.
Figure 6 is a fragmentary cross-sectional view taken on line 6—6 of Figure 5.

Referring to the drawings, 11 designates the tuner housing, said housing, by way of example, being generally rectangular in shape and having a front wall 12, a top wall 13, a bottom wall 14 and side walls 15. Secured in housing 11 is a liner 16 of sheet metal or the like having a vertical front portion 17 abutting the inner surface of front wall 12, a bottom portion 18 fastened to bottom wall 14, and a vertical rear flange 19 substantially flush with the rear plane of housing 11 and rising to a height slightly above the longitudinal axis of the housing, as shown in Figures 3 and 5. Secured to the upper intermediate portion of flange 19 and extending coaxially with said longitudinal axis is a rigid tubular member 20. At its rear end tubular member 20 is provided with an annular flange 21 by means of which it is riveted or otherwise rigidly secured to flange 19. At its forward end, member 20 is formed with a similar annular flange 22. Riveted, or otherwise rigidly secured to flange 22 is a rearwardly facing annular drum member 23. Drum member 23 is formed at its outer rim with an annular peripheral flange 24. Fitting annular drum member 23 is a relatively thick annular shell member 25 secured at its forward end to front flange 17 of liner 16 and secured at its inner rear portion to the annular drum member 23. The front wall 12 and flange 17 are formed with respective circular apertures 26 and 27 registering with the internal bore of annular shell member 25. Secured in the bore with its face exposed at front wall 12 of housing 11 is a conventional electric timer clock 28 of the type having normally open switch contacts closed at half-hour intervals by the clock. Figure 2 shows the timer 28 schematically, said timer being illustrated as having a rotating switch pole 29, engageable at half-hour intervals with stationary contacts 30, 30.

Designated at 31 is a bracket secured to rear flange 19 in the lower rear corner of liner 16, as shown in Figure 3. Secured on bracket 31 is the solenoid 32 having a slidable plunger 33 extending parallel to tubular member 20. As shown schematically in Figure 2, solenoid 32 is connected to a suitable power source through the contacts of the timer 28. Said solenoid therefore becomes energized each time switch pole 29 engages one of the contacts 30.

Figure 2 illustrates the invention in simplified form and will now be described in order to facilitate the further explanation of my device. As shown in Figure 2, 34 designates the tuning coil of a radio receiver and 35 designates a variable condenser normally employed in conjunction with coil 34 to tune the receiver. Designated at 36 is a single-pole, double-throw manually operated switch, which, in its lower position, shown in dotted view in Figure 2, connects the variable condenser 35 across the tuning coil 34. By way of example, coil 34 is shown connected across the input circuit of a radio frequency stage. It will be understood that said coil may alternatively be the tank coil of the local oscillator in a superheterodyne receiver, whereby the frequency of the oscillator is varied by means of the tank condenser 35 to thereby tune the receiver.

The upper contact of switch 36 is connected by a conductor 37 to an arcuate conductor bar 39. Designated at 38 is a pivoted armature linked to the plunger of solenoid 32. Located adjacent said bar 39 are the respective contacts 41 to 45. Designated at 46 to 50 are respective fixed tuning condensers connected respectively between the contacts 41 to 45 and the condenser ground wire 51. When solenoid 32 is energized, armature 38 is rotated clockwise as viewed in Figure 2. The armature 38 is provided with a biasing spring 52 which tends to return it to its normal open-circuit position, shown in Figure 2, when the solenoid 32 becomes deenergized. Designated at 53 is a rotatably adjustable member having angularly and longitudinally spaced projections 54. As will be subsequently pointed out, the member 53 is adjusted so that a circuit will be established for connecting a desired one of the condensers 46 to 50 across the tuning coil 34, depending upon what position armature 38 is held in subsequent to its return movement. In the simplified embodiment of the invention shown in Figure 2, the end of armature 38 may be engaged by one of the projections 54 at the end of its return movement. In this position armature 38 bridges bar 39 and one of the contacts 41 to 45, establishing the circuit for the desired fixed tuning condenser.

Referring now to Figures 3 to 5, it will be seen that in the practical embodiment of my invention therein illustrated, the solenoid plunger 33 is pivotally connected to the intermediate portion of an arm 55 which is pivoted at 56 to an upstanding bracket 57 secured to the bottom member 18 of the liner 16. A coiled spring 58 connects the lower end of arm 55 to bracket 31, biasing arm counterclockwise, as viewed in Figure 3. Arm 55 is rotated clockwise responsive to the energization of solenoid 32.

Encircling tubular member 20 and slidable thereon is a sleeve 59. The top end of arm 55 is connected to sleeve 59 by a pin 60 projecting from said sleeve which is received in a slot 61 formed in the arm. Secured inside member 20 is a longitudinally extending insulator 62 carrying the spaced contacts 63 to 67. Member 20 is formed with an elongated slot 68 above the insulator 62. Secured to sleeve 59 is a brush member 69 having a spring-biased contact 70 bearing on insulator 62 through slot 68 and being engageable respectively with the spaced contacts 63 to 67 as the sleeve 59 is moved longitudinally on member 20.

Sleeve 59 is formed at its forward end with an annular enlarged shell portion 71. Rotatably and slidably mounted on the forward portion of member 20 is a sleeve member 72 formed at its rear end with a flange 73 which is received within shell portion 71 and is engaged by the forward inwardly directed rim 74 of said shell portion. A coiled spring 75 encircles member 20 within shell portion 71 and bears between flange 73 and the rear end wall of said shell portion. Shell portion 71 carries an upstanding insulator 76 on which is mounted a depending spring contact arm 77 and a contact 78 normally spaced from arm 77. Sleeve 72 is formed with an upstanding arm 79 and an annular flange 80 merging with said arm 79. Secured on flange 80 around the sleeve 72 is an insulating ring 81. As will be subsequently explained, ring 81 at times exerts pressure on the spring contact 77 whereby said contact 77 is held against the contact 78.

Referring now to Figure 6, it will be seen that the periphery of the thick annular shell member 25 is formed with equally spaced longitudinal grooves 82. The grooves 82 extend rearwardly from the front end of the shell member for a major portion of the axial length thereof. Extending from the rear end of the shell member are the short longitudinal grooves 83 staggered between the grooves 82. The grooves 82 and 83 are interconnected by inclined grooves shown at 84 and 85. Each pair of grooves 82 connects with an intermediate rear groove 83 by a convergent pair of grooves 84 and 85, as shown in Figure 6. Secured adjacent the junction of each pair of convergent grooves 84 and 85 is a leaf spring 86, blocking the end of groove 84. The spring 86 is yieldable to allow an element in the groove 84 to move rearwardly toward the adjacent groove 83 but on return movement of said element the spring blocks reentry of the element and forces said element to return by way of the next subadjacent groove 85. A similar one-way check spring 87 is provided at the forward end of each groove 85.

Arm 79 is formed with a forwardly extending finger 88 overlying the periphery of shell member 25. The end of finger 88 is bent inwardly to define a lug 89 which is slidably received in the grooved periphery of the shell member. It will be seen that longitudinal reciprocation of sleeve 72 causes lug 89 to travel rearwardly in a first groove 82, then laterally in the groove 84 at the end of said first groove 82, then past the check spring 86 at the end of groove 84 into the next subadjacent groove 83. On the forward return stroke, the lug 89 is forced laterally still further into the adjacent groove 85 and past the check spring 87 at the end of said groove 85 into a second longitudinal groove 82. This causes a rotation of sleeve 72 through an angle equal to the angular spacing between adjacent longitudinal grooves 82, 82.

Secured to the front flange 17 of liner 16 around the shell member 25 is an annular housing 90 in which are rotatably mounted a plurality of cylindrical members 53, each member 53 extending parallel to member 20 and being radially aligned with one of the grooves 82. Each member 53 carries a plurality of projections 54, said projections being spaced both angularly and longitudinally on the cylindrical members 53. There are the same number of projections as contacts 63 to 67, namely, five projections in the specific embodiment of the invention shown herein. The projections are spaced apart angularly at intervals of 60°. Each cylindrical member 53 has a shaft 91 which extends rotatably through the front wall 12 of housing 11. A suitably indexed knob 92 is mounted on each shaft 91.

The respective cylinders 53 may each be adjusted by means of their knobs 92 so that a selected projection 54 thereof will be interposed in the path of return movement of the lug 89. Certain of the cylinders 53 may, if so desired, be adjusted in their zero positions, i. e. in the position wherein none of the projections 54 thereof lies in the path of return movement of lug 89.

When complete return movement of lug 89 is blocked by any one of the projections 54, ring 81 abuts spring contact 77, causing spring contact 77 to engage contact 78. At the same time sleeve 59 is held in a rearwardly adjusted position wherein brush member 69 overlies a selected one of the contacts 63 to 67. This corresponds to the bridging by armature 38 of contact bar 39 and one of the condenser contacts 41 to 45 described in connection with the simplified embodiment illustrated in Figure 2. Figure 7 shows the connections of the various contact elements of the device illustrated in Figures 1 and 3 to 6 in the fixed condenser selecting circuit of a radio receiver. The switch 36, is a manually operated selector switch which is employed to set the receiver either for normal manual tuning or for automatic timed tuning. The switch contacts 77 and 78 remain open until the sleeve 59 reaches the end of its permissible return movement where lug 89 is engaged by one of the projections 54, thereby maintaining the condenser selecting circuit open until contact 70 reaches its final position. In the event that lug 89 engages none of the projections 54, as in the case of a zero setting, contacts 77 and 78 do not close responsive to the return movement of lug 89 and the receiver must be tuned manually.

In the specific embodiment of the invention disclosed in Figures 1 and 3 to 7, provision is made for preselecting any one of five different programs every half hour over a total time period of twelve hours. As previously stated, certain half-hour periods may be omitted, as to preselection of programs, by setting the knobs 92 corresponding to said half-hour periods to zero positions. At the beginning of each half-hour period, timer 28 closes the energizing circuit for solenoid 32, causing plunger 33 to be retracted and swinging arm 55 clockwise, as viewed in Figure 3. Arm 55 moves sleeve 59 rearwardly, causing sleeve 72 to be drawn rearwardly and causing lug 89 to be moved rearwardly through a first groove 82 into the next adjacent rear groove 83. When timer 28 opens the solenoid energizing circuit, spring 58 swings arm 55 counterclockwise. Sleeve 59 acts through spring 75 to move sleeve 72 forwardly, returning lug 89 into a second groove 82. When lug 89 encounters a projection 54, its forward movement is terminated. Forward movement of sleeve 59 continues until it is stopped by the abutment of spring contact 77 with ring 81 and the closure of contact 78 with contact 77. At this time contact 70 engages the selected condenser contact and the receiver is tuned to the desired station frequency.

It will be understood that the device may be employed with equal effect for the timed selection of tuning inductors instead of condensers, or for other devices which will set the receiver to resonance with the desired station frequencies. It will be further obvious that any desired number of stations may be selected by providing corresponding numbers of cylinder projections 54, contacts, and tuning elements such as fixed condensers or inductors.

While a specific embodiment of a time controlled automatic radio tuner has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A time-controlled tuning device of the character described comprising an elongated support, a solenoid, means for momentarily energizing said solenoid at regularly spaced times over a period of time, a plurality of tuning elements, a radio receiver circuit, a plurality of longitudinally spaced contacts carried on said support, each contact being connected to one of said tuning elements, a contactor slidably carried on said support and engageable with each of said contacts, circuit means connecting said contactor to one side of the receiver circuit and said tuning elements to the other side of the receiver circuit whereby the respective tuning elements are individually connected in the receiver circuit when the contactor engages the contact associated with each tuning element, means moving the contactor successively over the contacts responsive to energization of the solenoid, means biasing the contactor for return movement, an annular body secured to said support, the periphery of said body being formed with longitudinal grooves and additional convergent grooves interconnecting adjacent longitudinal grooves at their rear ends, a guide member rotatably and slidably mounted on said support and having an arm slidably engaged in the grooves, means mechanically coupling the guide member to the contactor for simultaneous longitudinal movement, means on the annular body cooperating with said arm to limit said arm to progressive rotary movement in one direction only around the periphery of the body, and adjustable stop members mounted on the body over the respective longitudinal grooves and being engageable with the arm to selectively limit return movement of the arm in the grooves to positions wherein the contactor engages selected contacts.

2. A time-controlled device of the character described comprising an elongated support, a solenoid, means for momentarily energizing said solenoid at regularly spaced times over a period of time, a plurality of longitudinally spaced contacts carried on said support, a contactor slidably carried on said support and engageable with each of said contacts, means moving the contactor successively over the contacts responsive to energization of the solenoid, means biasing the contactor for return movement, an annular body secured to said support, the periphery of said body being formed with longitudinal grooves and additional convergent grooves interconnecting adjacent longitudinal grooves at their rear ends, a guide member rotatably and slidably mounted on said support and having an arm slidably engaged in the grooves, means mechanically coupling the guide member to the contactor for simultaneous longitudinal movement, means on the annular body cooperating with said arm to limit said arm to progressive rotary movement in one direction only around the periphery of the body, and rotatable members mounted on the body over the respective longitudinal grooves, each rotatable member having a plurality of angularly and longitudinally spaced projections which may be selectively interposed in the grooves in the path of return movement of the arm.

3. A time-controlled device of the character described comprising an elongated support, a solenoid, means for momentarily energizing said solenoid at regularly spaced times over a period of time, a plurality of longitudinally spaced contacts carried on said support, a contactor slidably carried on said support and engageable with each of said contacts, means moving the contactor successively over the contacts responsive to energization of the solenoid, means biasing the contactor for return movement, an annular body secured to said support, the periphery of said body being formed with longitudinal grooves and additional convergent grooves interconnecting adjacent longitudinal grooves at their rear ends, a guide member rotatably and slidably mounted on said support and having an arm slidably engaged in the grooves, means defining a longitudinally yieldable rotative joint between said guide member and contactor, means on the annular body cooperating with said arm to limit said arm to progressive rotary movement in one direction only around the periphery of the body, adjustable stop members mounted on the body over the respective longitudinal grooves and being engageable with the arm to selectively limit return movement of the arm in the grooves to positions wherein the contactor engages selected contacts, and cooperating circuit-closing means carried by the contactor and the guide member at said yieldable joint.

4. A time-controlled tuning device of the character described comprising an elongated support, a solenoid, means for momentarily energizing said solenoid at regularly spaced times over a period of time, a plurality of tuning elements, a radio receiver circuit, a plurality of spaced contacts carried on said support, each contact being connected to one of said tuning elements, a contactor slidably carried on said support and selectively engageable with each of said contacts, circuit means connecting said contactor to one side of the receiver circuit and said tuning elements to the other side of the receiver circuit, whereby the respective tuning elements are individually connected in the receiver circuit when the contactor engages the contact associated with each tuning element, means moving the contactor successively over the contacts responsive to energization of the solenoid, means biasing the contactor for return movement, a member movably mounted on said support and rotatably connected to said contactor for simultaneous longitudinal movement with said contactor, cooperating means on said support and said member rotating said member progressively around said support responsive to successive movements of the contactor, and respective manually adjustable stop elements around said support selectively engageable with said member and arranged to selectively limit return movement of the contactor to positions wherein it engages the respective contacts.

5. In a time-controlled tuning device of the character described, an elongated support, a solenoid, means for momentarily energizing said solenoid at regularly spaced times over a period of time, a plurality of spaced contacts carried on said support, a contactor slidably carried on said support and selectively engageable with each of said contacts, means moving the contactor successively over the contacts responsive to energization of the solenoid, means biasing the contactor for return movement, a member movably mounted on said support and rotatably connected to said contactor for simultaneous longitudinal movement with said contactor, cooperating means on said support and said member rotating said member progressively around said support responsive to successive movements of the contactor, and respective manually adjustable stop elements around said support selectively engageable with said member and arranged to selectively limit return movement of the contactor to positions wherein it engages the respective contacts.

FRANK SCALISE.

REFERENCES CITED

The following references are of record in the file of this patent:

UNITED STATES PATENTS

| Number | Name | Date |
|---|---|---|
| 393,183 | Stocker | Nov. 20, 1888 |
| 946,045 | Hubbard | Jan. 11, 1910 |
| 2,019,157 | Rice et al. | Oct. 29, 1935 |
| 2,029,909 | Cassell | Feb. 4, 1936 |
| 2,051,438 | Dwyer | Aug. 18, 1936 |
| 2,068,227 | Cutler et al. | Jan. 19, 1937 |
| 2,166,691 | Pare | July 18, 1939 |
| 946,045 | Hubbard | Jan. 11, 1910 |
| 2,389,990 | Magnusson | Nov. 27, 1945 |